(12) United States Patent
Kim et al.

(10) Patent No.: US 9,083,919 B2
(45) Date of Patent: Jul. 14, 2015

(54) METHOD AND APPARATUS FOR ENHANCING CHROMA OF INPUT IMAGE

(75) Inventors: Youn-jin Kim, Suwon-si (KR); Young-shin Kwak, Ulsan (KR); Se-hyeok Park, Seoul (KR); Soo-yeon Lee, Ulsan (KR); Jae-hyun Kim, Suwon-si (KR)

(73) Assignees: SAMSUNG ELECTRONICS CO., LTD., Gyeonggi-do (KR); UNIST ACADEMY-INDUSTRY RESEARCH CORPORATION, Ulsan (KR)

( * ) Notice: Subject to any disclaimer, the term of this patent is extended or adjusted under 35 U.S.C. 154(b) by 298 days.

(21) Appl. No.: 13/347,887

(22) Filed: Jan. 11, 2012

(65) Prior Publication Data
US 2012/0308133 A1 Dec. 6, 2012

(30) Foreign Application Priority Data

Jun. 1, 2011 (KR) .................. 10-2011-0052996

(51) Int. Cl.
*G06K 9/00* (2006.01)
*H04N 1/60* (2006.01)
(52) U.S. Cl.
CPC .................. *H04N 1/6005* (2013.01)

(58) Field of Classification Search
USPC ........................................ 382/167
See application file for complete search history.

(56) References Cited

U.S. PATENT DOCUMENTS

| 7,548,357 B2 | 6/2009 | Moriya | |
|---|---|---|---|
| 7,813,003 B2 | 10/2010 | Lin | |
| 2003/0052894 A1* | 3/2003 | Akiyama et al. | 345/589 |
| 2006/0061588 A1 | 3/2006 | Ok et al. | |
| 2007/0139448 A1* | 6/2007 | Chen | 345/690 |
| 2008/0266314 A1 | 10/2008 | Butterworth | |
| 2009/0022395 A1 | 1/2009 | Cho et al. | |
| 2009/0034837 A1* | 2/2009 | Kato et al. | 382/167 |
| 2009/0244664 A1* | 10/2009 | Kanai | 358/530 |

FOREIGN PATENT DOCUMENTS

| KR | 10-2006-0026492 A | 3/2006 |
|---|---|---|
| KR | 10-2007-0066030 A | 6/2007 |
| KR | 10-2009-0009450 A | 1/2009 |

\* cited by examiner

*Primary Examiner* — Hadi Akhavannik
(74) *Attorney, Agent, or Firm* — Sughrue Mion, PLLC

(57) ABSTRACT

A method and apparatus for enhancing chroma of an input image by performing chroma conversion on a chroma value of a chroma component of the input image and compensating for a variation in a brightness value of the input image, based on the chroma value on which the chroma conversion is performed.

23 Claims, 5 Drawing Sheets

METHOD AND APPARATUS FOR ENHANCING CHROMA OF INPUT IMAGE

CROSS-REFERENCE TO RELATED PATENT APPLICATION

This application claims priority from Korean Patent Application No. 10-2011-0052996, filed on Jun. 1, 2011, in the Korean Intellectual Property Office, the disclosure of which is incorporated herein by reference in its entirety.

BACKGROUND

1. Field

Methods and apparatuses consistent with exemplary embodiments relate to a method of enhancing chroma, which is used in an image output apparatus, for example, a digital display, a printer, or a digital camera.

2. Description of the Related Art

In order to enhance color gamut in an image output apparatus, it is necessary to independently control hue, brightness, and chroma for each respective pixel of an input image. For example, when controlling chroma, it is necessary not to change brightness or hue.

Conventionally, when a device dependent color space, such as YCbCr that is a color space including a brightness signal and a chroma signal is mainly used, since YCbCr values, and perceived hue, brightness and chroma values are not independent of each other, a method of controlling chroma by using a CbCr signal may not obtain the desired color gamut. That is, when the chroma of an image is changed by controlling CbCr values in the YCbCr color space, since the brightness of the image is also affected, the image may become bright or dark. Thus, information about detail and texture of the image may be lost, thereby reducing the definition of the image. In order to solve this problem, device independent color spaces such as CIELAB or CIECAM02 may be used. However, since a method of controlling chroma in such a device independent color space includes complicated calculation processes, it is difficult to use the method in image output apparatuses requiring real-time calculations, such as in a digital display, a printer, or a digital camera.

SUMMARY

The exemplary embodiments provide a method of converting chroma of an input image in a device dependent color space, and an apparatus for performing the method.

According to an aspect of an exemplary embodiment, there is provided a method of enhancing chroma of an input image, the method including performing chroma conversion on a chroma value of a chroma component of the input image; and compensating for a variation in a brightness value of a brightness component of the input image, the variation resulting from performing the chroma conversion, based on the chroma value on which the chroma conversion is performed.

A color space in which the chroma conversion is performed may be a device dependent color space.

The device dependent color space may be one of a YCbCr color space, a Hue, Saturation, Value (HSV) color space, and a Hue, Saturation, Intensity (HSI) color space.

When the color space in which the chroma conversion is performed is a YCbCr color space, the brightness component is Y, and the chroma component may be Cb and Cr.

A color space in which the chroma conversion and the compensating are performed may be a device dependent color space, and a chroma component value and a brightness component value of the input image in a device independent color space may be substantially the same as values obtained by converting a color space including a chroma component value and a brightness component value on which the chroma conversion and the compensating are performed, in a device independent color space.

The chroma conversion may be performed according to a predetermined parameter, may be performed in consideration of characteristics of an imaging apparatus for performing the chroma conversion, or may be performed according to an input signal received from an external source.

The chroma conversion and the compensating may be performed in units of pixels of the input image.

The method may further include, when the input image is a RGB image, performing color-space conversion on the RGB image, and dividing the input image into the brightness component and the chroma component.

The input image may further include a hue value of a hue component of the input image.

According to another aspect of an exemplary embodiment, there is provided an apparatus for enhancing chroma of an input image, the apparatus including a chroma converting unit that performs chroma conversion on a chroma value of a chroma component of the input image; and a brightness compensating unit that compensates for a variation in a brightness value of a brightness component of the input image, the variation resulting from performing the chroma conversion, based on the chroma value on which the chroma conversion is performed.

According to another aspect of an exemplary embodiment, there is provided a digital display apparatus including the apparatus for enhancing chroma, the apparatus for enhancing chroma including a chroma converting unit that performs chroma conversion on a chroma value of a chroma component of the input image; and a brightness compensating unit that compensates for a variation in a brightness value of a brightness component of the input image, the variation resulting from performing the chroma conversion, based on the chroma value on which the chroma conversion is performed.

According to another aspect of an exemplary embodiment, there is provided a computer readable recording medium having recorded thereon a program for executing a method of enhancing chroma of an input image, the method including performing chroma conversion on a chroma value of a chroma component of the input image; and compensating for a variation in a brightness value of a brightness component of the input image, the variation resulting from performing the chroma conversion, based on the chroma value on which the chroma conversion is performed.

BRIEF DESCRIPTION OF THE DRAWINGS

The above and other aspects will become more apparent by describing in detail exemplary embodiments thereof with reference to the attached drawings, in which.

DETAILED DESCRIPTION OF THE EXEMPLARY EMBODIMENTS

Hereinafter, the aspects of the disclosure will be described in detail by explaining exemplary embodiments thereof with reference to the attached drawings. Hereinafter, the terminology 'image' includes a moving picture as well as a still image, and, will be comprehensively used throughout this specification.

Figure 1:
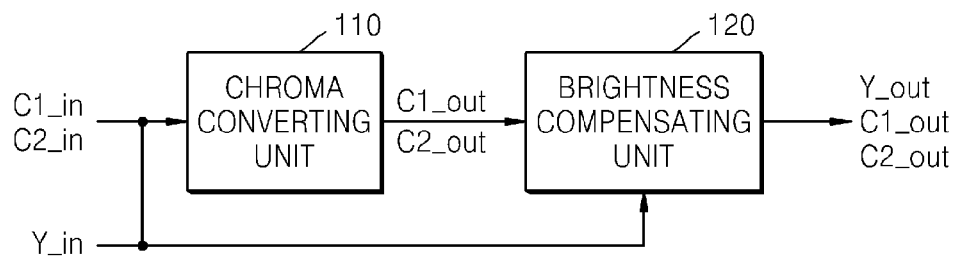
FIG. 1 is a block diagram of a chroma converting apparatus according to an exemplary embodiment.

FIG. 1 is a block diagram of a chroma converting apparatus according to an exemplary embodiment.

The chroma converting apparatus includes a chroma converting unit 110 and a brightness compensating unit 120.

According to the present exemplary embodiment, it is assumed that an image signal of a YCbCr color space is input to the chroma converting apparatus, and that an image output apparatus is a digital display. However, in addition to the YCbCr color space, a device dependent color space that is divided into brightness information and chroma information may be used. For example, color spaces such as HSV (Hue, Saturation, Value), HSI (Hue, Saturation, Intensity), and HSL (Hue, Saturation, Lightness) may be used. In addition, the image output apparatus may be a different type of image output apparatus, such as a printer, a digital camera, or a digital camcorder.

The chroma converting unit 110 converts a chroma component value of an input image, that is, a chroma value of the input image, by increasing or reducing the chroma component value of the input image, that is, chroma of signals C1_in and C2_in. When chroma conversion is performed in a YCbCr color space, C1_in and C2_in refer to values Cb and Cr, that is, values Cb_in and Cr_in, respectively. In FIG. 1, the chroma component value converted by the chroma converting unit 110 is output from the chroma converting unit 110 to the brightness compensating unit 120. However, the converted chroma component value may be output from the chroma converting unit 110 to the brightness compensating unit 120, and simultaneously, is output from the chroma converting apparatus to a display unit (not shown).

Figure 2:
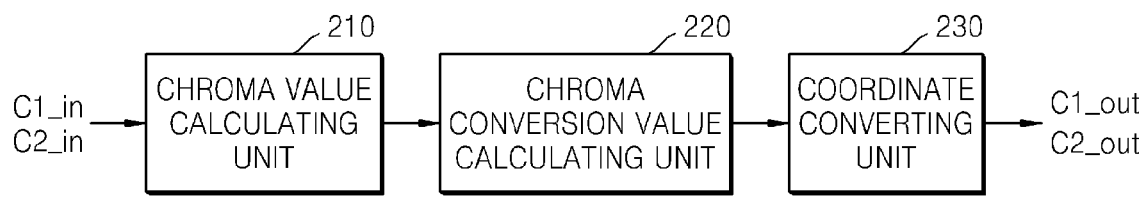
FIG. 2 is a diagram of an example of the chroma converting unit of FIG. 1, according to an exemplary embodiment.

FIG. 2 is a diagram of an example of the chroma converting unit 110, according to an exemplary embodiment. Referring to FIG. 2, the chroma converting unit 110 includes a chroma value calculating unit 210, a chroma conversion value calculating unit 220, and a coordinate converting unit 230.

The chroma value calculating unit 210 calculates a chroma value, that is, $(Cb^2+Cb^2)^{1/2}$ from Cb and Cr values of a single pixel of an input image. In this case, the chroma value may be calculated according to (Cb+Cr)/2. Selectively, the chroma value calculating unit 210 may calculate Cr/Cb that is a hue value. The hue value calculated by the chroma value calculating unit 210 may be used to compensate for brightness in the brightness compensating unit 120. In this case, the hue value may be calculated according to arctan(Cb/Cr).

Figure 3:
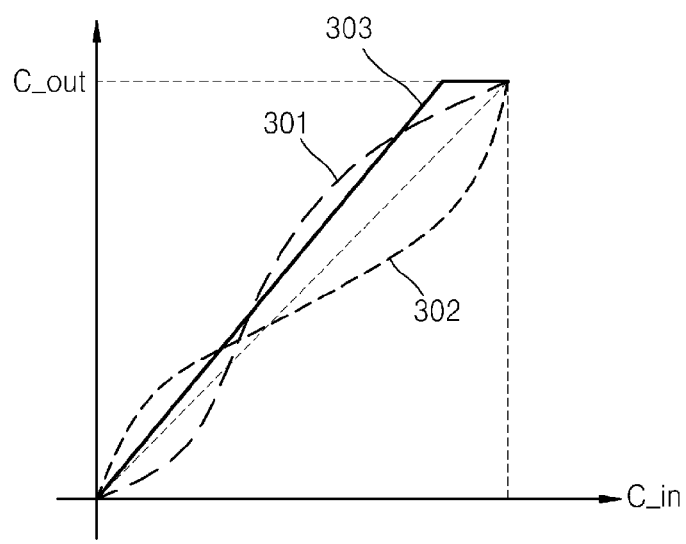
FIG. 3 is a graph for explaining a case where a chroma value is converted, according to an exemplary embodiment.

The chroma conversion value calculating unit 220 may convert the chroma value calculated by the chroma value calculating unit 210. FIG. 3 is a graph for explaining a case where a chroma value is converted, according to an exemplary embodiment.

Referring to FIG. 3, chroma values used to perform chroma conversion, that is, an S-shaped curve 301, an inverse S-shaped curve 302, and a straight line 303 may be obtained according to Equations 1 through 3 below. Shapes of the S-shaped curve 301 and the inverse S-shaped curve 302 may be changed according to $K_1$ and $K_2$ in Equations 1 and 2. $K_1$ and $K_2$ may vary according to hue regions.

$$F = 128 \times \left\{ \sin\left(\left(\frac{\text{Input Chroma}}{128}\right) \times \left(\frac{\pi}{2}\right)\right) \right\}^{K_1} \quad (1)$$

$$G = 128 \times \sin^{-1}\left(\left(\frac{\text{Input Chroma}}{128}\right)^{\frac{1}{k_2}}\right) \quad (2)$$

In this case, I, that is, Input Chroma, is an input chroma value, and an output chroma value is determined according to Equation 3 below.

Output chroma value=$F+G-I$ (3)

In the S-shaped curve 301 used to perform the chroma conversion in FIG. 3, in a case of a weak color, for example, a weak red, an output chroma value C_out is reduced compared to an input chroma value C_in. In a case of a strong color, for example, a strong red, the output chroma value C_out is increased compared to the input chroma value C_in.

On the other hand, in the inverse S-shaped curve 302, when in a case of a weak color, for example, a weak red, the output chroma value C_out is increased compared to the input chroma value C_in. In a case of a strong color, for example, a strong red, the output chroma value C_out is reduced compared to the input chroma value C_in.

When the chroma conversion is performed according to the straight line 303, the output chroma value C_out is converted in proportion to the input chroma value C_in.

The coordinate converting unit 230 converts the chroma value generated by the chroma conversion value calculating unit 220 into a CbCr coordinate, and outputs the converted C1_out and C2_out, that is, the converted values Cb and Cr.

According to an exemplary embodiment, the chroma conversion may be performed according to a predetermined parameter. Alternatively, the chroma conversion may be performed in consideration of characteristics of an imaging apparatus for performing the chroma conversion, or may be performed according to an input signal received from an external source.

The brightness compensating unit 120 predicts a brightness variation that occurs through the chroma converting unit 110, calculates a variation degree ΔY of brightness for compensating for the brightness variation, and outputs a value obtained by adding ΔY to input Y_in.

According to an exemplary embodiment, an input image signal is divided into a brightness component and a chroma component, and then only the chroma component is converted. However, in a color space where a brightness component and a chroma component are not completely independently divided, such as a device dependent color space, when chroma varies through the chroma converting unit 110, since brightness also varies, the brightness variation needs to be compensated for.

This is because since a brightness component and a hue component are not completely divided in the device dependent color space such as YCbCr, even through only the hue component varies, perceived brightness varies.

The brightness compensating unit 120 determines a degree of compensating for the brightness variation in consideration of the brightness of an input image and a variation rate of chroma of the input image, wherein the variation is performed by the chroma converting unit 110, and compensates for a variation in a value of the brightness component of the input image, that is, a variation in a brightness value.

For example, when the chroma conversion is performed in the YCbCr color space, a value for compensating for the brightness variation may be calculated according to Equation 4 below.

$$\Delta Y = f(hue, \text{YCC\_chroma}, Y, \text{Chroma\_weight}) \quad (4)$$
$$= a1 \cdot (\text{YCC\_chroma})^{a2} \cdot (a3 \cdot \ln(Y/255 - a4) + a5) \cdot$$
$$[\text{Chroma\_weight}^2 - a6 \cdot \text{Chroma\_weight} + (a6 - 1)]$$

In Equation 4, $\Delta Y$ is a brightness compensating value. YCC_chroma is a chroma value calculated by using Cb_in and Cb_in that are Cb and Cr of the input image in the YCbCr color space, that is, $(Cb\_in^2 + Cr\_in^2)^{1/2}$. Chroma_weight is a ratio of an input chroma value to an output chroma value, that is, $(Cb\_in^2 + Cr\_in^2)^{1/2}/(Cb\_out^2 + Cr\_out^2)^{1/2}$. A value 'hue' may be generated by the chroma converting unit 110, or may be generated by using Cb and Cr of the input image in the brightness compensating unit 120.

In addition, six parameters, that is, a1 through a6, may vary according to a hue region, and may be experimentally determined. A brightness value that is finally output from the brightness compensating unit 120 is Y_out that is an output Y value for each respective pixel of the input image, and is determined as Y_in+$\Delta Y$.

According the present exemplary embodiment, the brightness compensating value is calculated based on the hue, chroma and brightness values of the input image, the ratio of the input chroma value to the output chroma value. Alternatively, the brightness compensating value may be calculated based on the brightness value of the input image and the variation rate of a chroma value.

When the chroma conversion is performed in a device dependent color space, for example, YCbCr that is a color space including a brightness component and a chroma component, brightness of the input image may vary, thereby reducing the definition of the input image. However, according to an exemplary embodiment, this problem with reducing the definition of the input image may be overcome.

According to an exemplary embodiment, the chroma conversion is performed in a YCbCr color space in order to enhance chroma. Alternatively, the chroma conversion may be performed in device dependent color spaces, for example, in a HSV, HSI, or HSL color space.

In addition, according to an exemplary embodiment, a color gamut obtained in a device dependent color space may be the same as a color gamut that is obtained when hue, brightness and chroma components are converted in a device independent color space.

Figure 4:
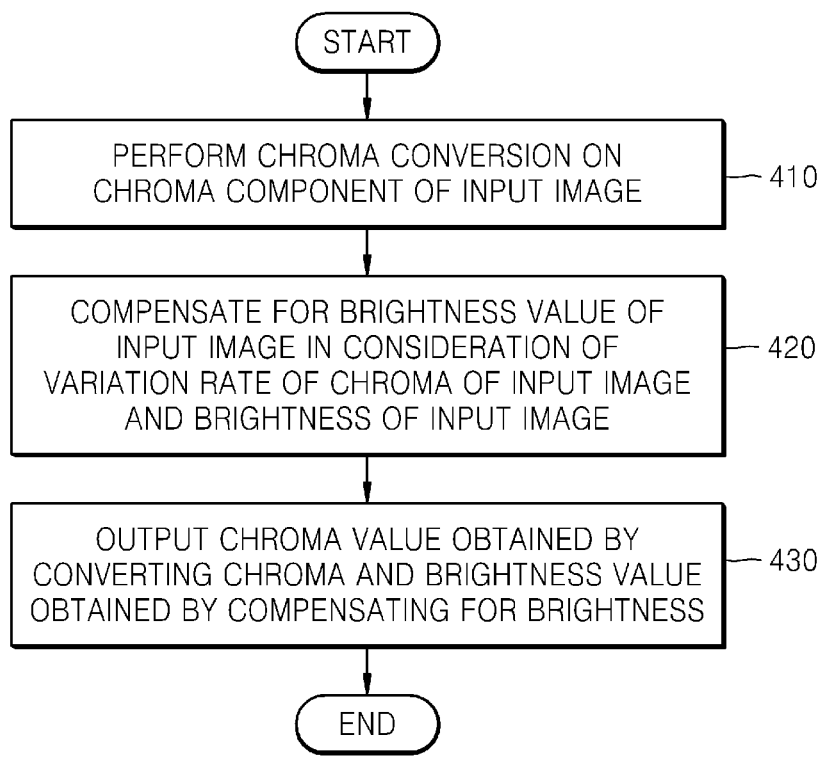
FIG. 4 is a flowchart of a method of converting chroma, which is performed in the chroma converting apparatus of FIG. 1, according to an exemplary embodiment.

FIG. 4 is a flowchart of a method of converting chroma, which is performed in the chroma converting apparatus of FIG. 1, according to an exemplary embodiment.

In operation 410, a chroma component value of an input image, that is, a chroma value of the input image is converted by increasing or reducing the chroma component value of the input image, that is, chroma of signals C1_in and C2_in. When chroma conversion is performed in a YCbCr color space, C1_in and C2_in refer to values Cb and Cr, that is, values Cb_in and Cr_in, respectively.

In operation 420, a brightness variation that occurs during the chroma conversion is predicted, a variation degree $\Delta$ of brightness for compensating for the brightness variation is calculated, and a value obtained by adding $\Delta$ to input Y_in is output. According to an exemplary embodiment, a degree of compensating for the brightness variation is determined in consideration of the brightness of an input image and a variation rate of chroma of the input image, and the brightness variation is compensated for. Selectively, the variation degree $\Delta$ of brightness may be calculated according to Equation 4.

According to an exemplary embodiment, the chroma conversion is performed in a YCbCr color space to enhance chroma. Alternatively, the chroma conversion may be performed in device dependent color spaces, for example, in an HSV, an HSI, or an HSL color space.

In operation 430, a chroma value obtained by converting chroma and a brightness value obtained by compensating for the brightness variation are output.

Figure 5A:
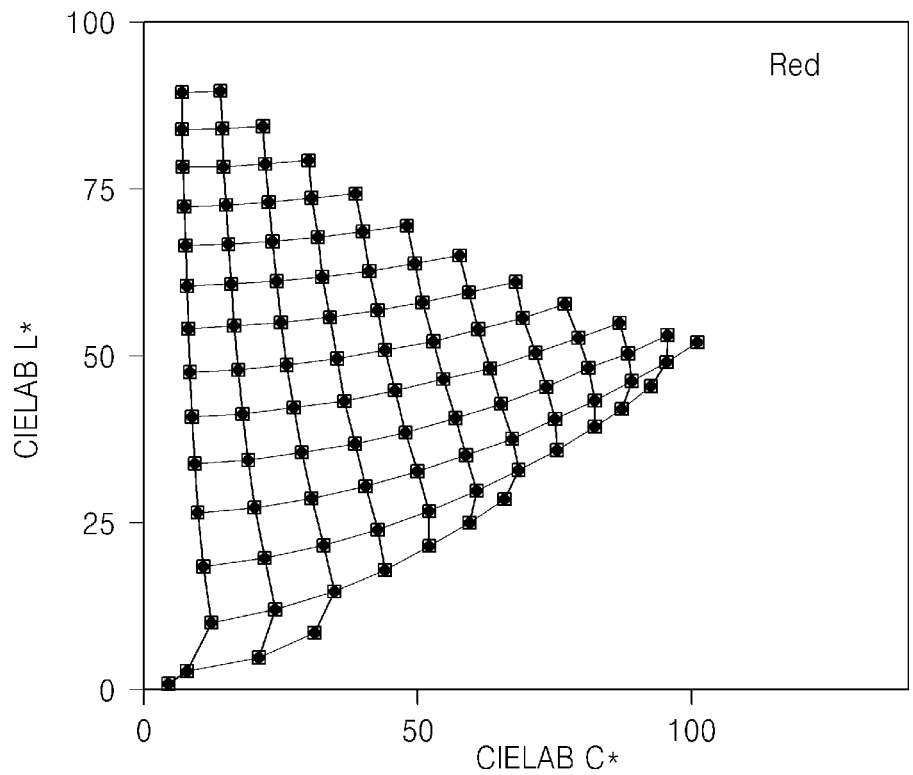
FIG. 5A is a graph for explaining a method of converting chroma, according to an exemplary embodiment.

FIG. 5A is a graph for explaining a method of converting chroma, according to an exemplary embodiment.

FIG. 5A shows that colors, which are sampled at predetermined intervals in a YCbCr that is a device dependent color space, are indicated in a CIELAB color space, that is, an L*a*b* color space that is a device dependent color space. Referring to FIG. 5A, even through a Y value does not vary, an L* that is a brightness value varies remarkably according to variations in CbCr.

In the L*a*b* color space, L* is brightness, a* is a color region from a red color RED to a green color GREEN, and b* is a color region from a yellow color YELLOW to a blue color BLUE. In FIG. 5A, C* is $(a^{*2}+b^{*2})^{1/2}$.

Figure 5B:
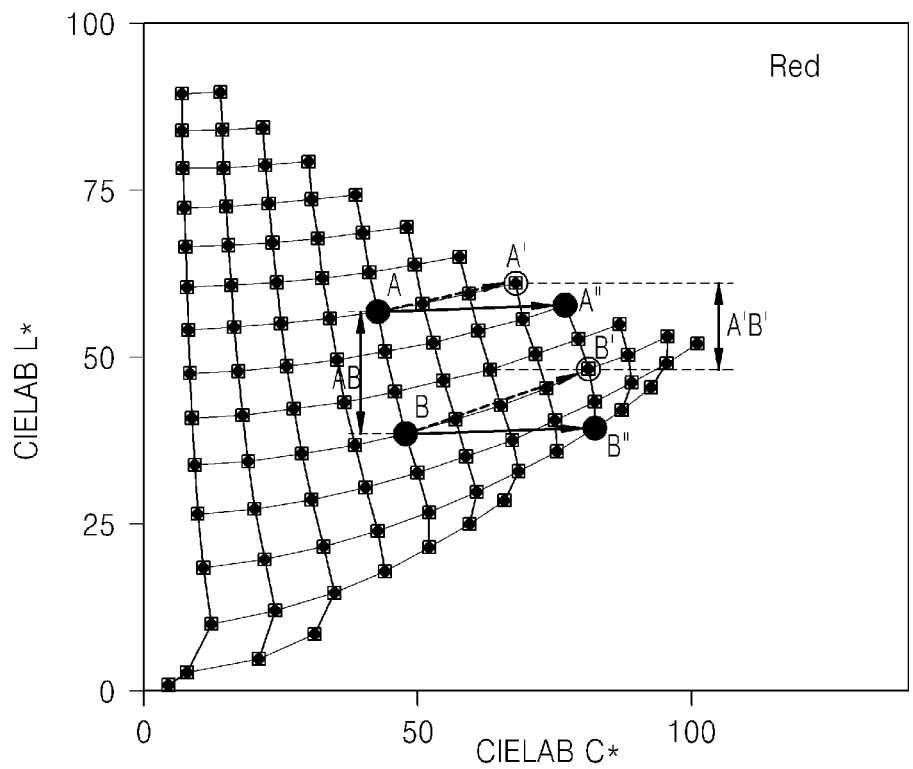
FIG. 5B is a graph for explaining a method of converting chroma, according to an exemplary embodiment.

FIG. 5B is a graph for explaining a method of converting chroma, according to an exemplary embodiment.

FIG. 5B shows a case where positions A and B are changed to positions A' and B' when chroma values of colors corresponding to the position A and B are increased by using a conventional method of converting chroma in a device dependent color space. Referring to FIG. 5B, even through a Y value does not vary, resulting values L* that are brightness values of colors corresponding to the position A' and B' are increased compared to original values L*. In particular, a width by which brightness of color having low Y is increased is greater than a width by which brightness of color having high Y is increased, and thus a difference in the brightness values of the colors corresponding to A and B is greater than a difference in the brightness of the colors corresponding to A' and B'. That is, AB>A'B' may be obtained, which means that brightness contrast of the colors corresponding to the positions A and B is reduced after their chroma is increased.

In addition, with reference to FIG. 5B, when chroma values of the colors corresponding to the positions A and B are increased, the positions A and B are respectively mapped to positions A" and B", but not to the positions A' and B'. Thus, a problem with brightness variation and reduction in brightness contrast due to chroma conversion in a conventional device dependent color space may be overcome.

Figure 6:
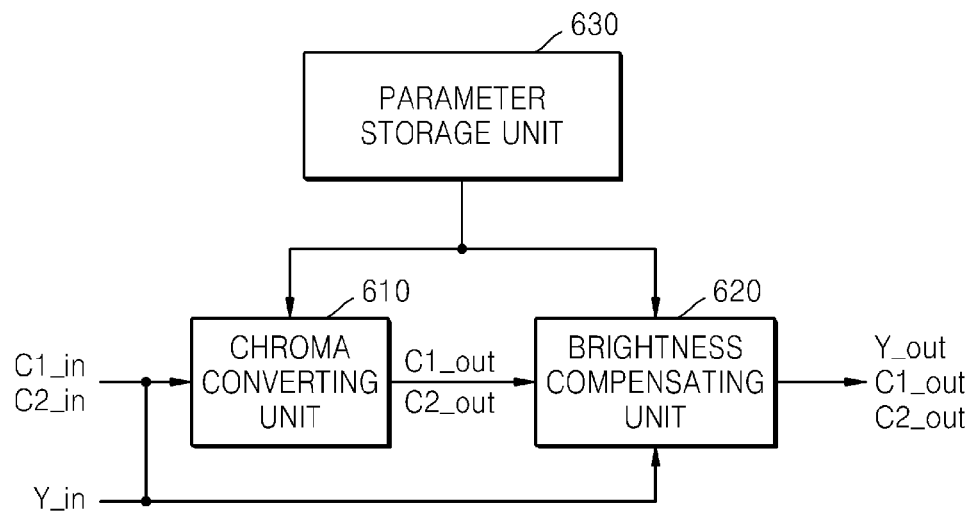
FIG. 6 is a block diagram of a chroma converting apparatus according to an exemplary embodiment.

FIG. 6 is a block diagram of a chroma converting apparatus according to an exemplary embodiment. The chroma converting apparatus of FIG. 6 includes a chroma converting unit 610 and a brightness compensating unit 620, which respectively perform functions corresponding to the chroma converting unit 110 and the brightness compensating unit 120 of FIG. 1, and a parameter storage unit 630.

Hereinafter, for convenience of description, details of the chroma converting unit 610 and the brightness compensating unit 620 will be omitted.

The parameter storage unit 630 stores parameters required to perform chroma conversion in the chroma converting unit 610, and parameters required to perform brightness compensation in the brightness compensating unit 620.

The chroma converting unit 610 and the brightness compensating unit 620 respectively perform chroma conversion and brightness compensation by using the parameters stored in the parameter storage unit 630.

Figure 7:
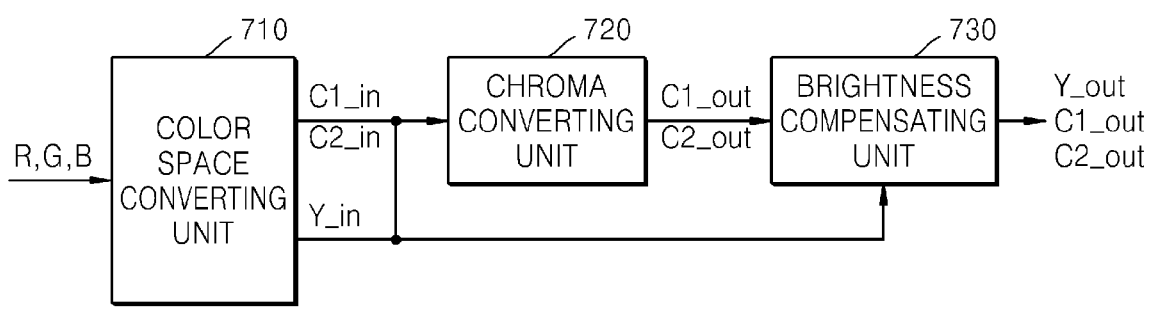
FIG. 7 is a block diagram of a chroma converting apparatus according to an exemplary embodiment.

FIG. 7 is a block diagram of a chroma converting apparatus according to an exemplary embodiment.

The chroma converting apparatus of FIG. 7 includes a chroma converting unit 720 and a brightness compensating unit 730, which respectively perform functions corresponding to the chroma converting unit 110 and the brightness compensating unit 120 of FIG. 1, and a color space converting unit 710. Hereinafter, for convenience of description, details of the chroma converting unit 720 and the brightness compensating unit 730 will be omitted.

The color space converting unit 710 converts an RGB color space input to the chroma converting apparatus into a YCbCr color space. Color signals of the RGB color space may be converted into color signals of the YCbCr color space according to Equation 5.

$$Y = (0.257*R) + (0.504*G) + (0.098*B) + 16$$

$$Cb = -(0.148*R) - (0.291*G) + (0.439*B) + 128$$

$$Cr = (0.439*R) - (0.368*G) - (0.071*B) + 128 \quad (5)$$

According to the present exemplary embodiment, a method of enhancing chroma is performed in a YCbCr color space. Alternatively, the method may be performed in color spaces, for example, an HSV, an HSI, or an HSL color space. In this case, the color space converting unit 710 converts the RGB color space into an HSI color space or an HSV color space.

Figure 8:
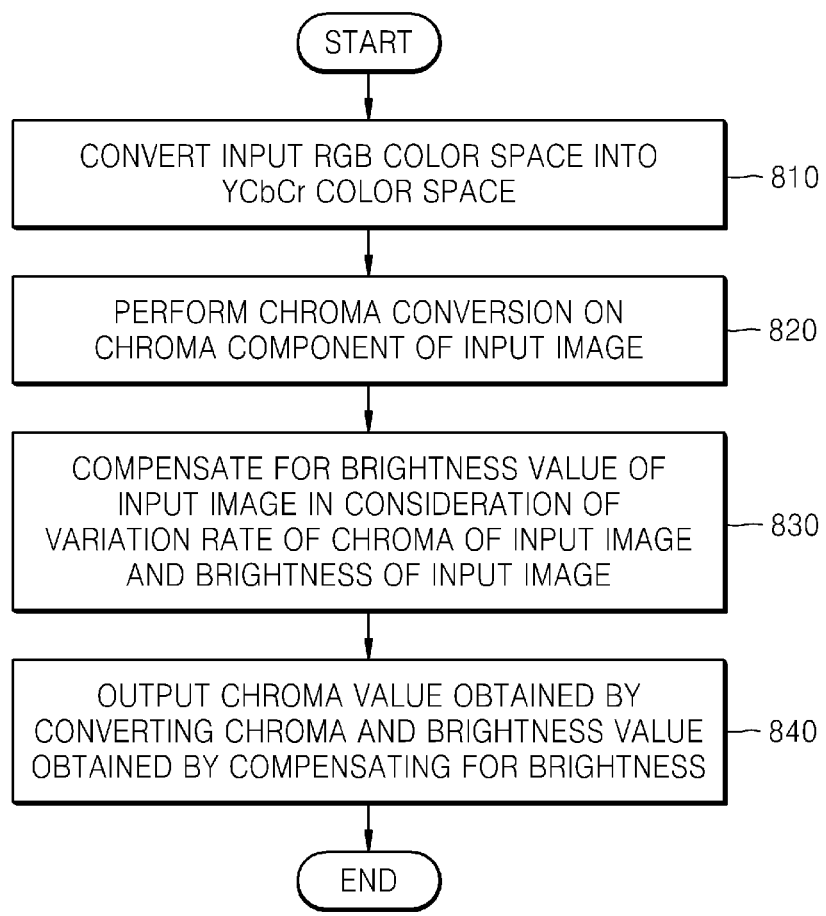
FIG. 8 is a flowchart of a method of converting chroma, which is performed in the chroma converting apparatus of FIG. 7, according to an exemplary embodiment.

FIG. 8 is a flowchart of a method of converting chroma, which is performed in the chroma converting apparatus of FIG. 7, according to an exemplary embodiment.

In operation 810, an RGB color space input to the chroma converting apparatus is converted into a YCbCr color space. According to the present exemplary embodiment, a method of enhancing chroma is performed in a YCbCr color space. Alternatively, the method may be performed in color spaces, for example, in an HSV, an HSI, or an HSL color space. In this case, in operation 810, the RGB color space is converted into an HSI color space or an HSV color space.

In operation 820, a chroma component value of an input image, that is, a chroma value of the input image is converted by increasing or reducing the chroma component value of the input image, that is, chroma of signals C1_in and C2_in. When chroma conversion is performed in a YCbCr color space, C1_in and C2_in refer to values Cb and Cr, that is, values Cb_in and Cr_in, respectively.

In operation 830, a brightness variation that occurs during the chroma conversion is predicted, a variation degree Δ of brightness for compensating for the brightness variation is calculated, and a value obtained by adding Δ to input Y_in is output. According to an exemplary embodiment, a degree of compensating for the brightness variation is determined in consideration of the brightness of an input image and a variation rate of chroma of the input image, and the brightness variation is compensated for. Selectively, the variation degree Δ of brightness may be calculated according to Equation 4.

According to an exemplary embodiment, the chroma conversion is performed in a YCbCr color space to enhance chroma. Alternatively, the chroma conversion may be performed in device dependent color spaces, for example, in an HSV, an HSI, or an HSL color space.

In operation 840, a chroma value obtained by converting chroma and a brightness value obtained by compensating for the brightness variation are output.

The exemplary embodiments illustrated in the FIGS. may be embodied by an apparatus that includes a bus coupled to every unit of the apparatus, at least one processor (e.g., central processing unit, microprocessor, etc.) that is connected to the bus for controlling the operations of the apparatus to implement the above-described functions and executing commands, and a memory connected to the bus to store the commands, received messages, and generated messages.

As will also be understood by the skilled artisan, the exemplary embodiments may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. For example, the chroma converting unit 610 and brightness compensating unit 620 of FIG. 6 may be embodied as any combination of programmable logic elements or software elements of the processor and the parameter storage unit 630 may be a memory that stores parameters. The functionality provided for in the components and units may be combined into fewer components and units or modules or further separated into additional components and units or modules.

The exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Alternately, the exemplary embodiments may be embodied as computer-readable transmission media as signals or carrier waves for transmission over a network, for example the Internet.

While the aspects of the disclosure have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of enhancing chroma of an input image, the method comprising:

performing chroma conversion on a chroma value of a chroma component of the input image without converting a brightness value of a brightness component of the input image; and compensating for a variation in an unconverted brightness value of the brightness component of the input image, the variation resulting from performing the chroma conversion, based on the chroma value on which the chroma conversion is performed.

2. The method of claim 1, wherein a color space in which the chroma conversion is performed is a device dependent color space.

3. The method of claim 2, wherein the device dependent color space is one of a YCbCr color space, a Hue, Saturation, Value (HSV) color space, and a Hue, Saturation, Intensity (HSI) color space.

4. The method of claim 1, wherein, when the color space in which the chroma conversion is performed is a YCbCr color space, the brightness component is Y, and the chroma component is Cb and Cr.

5. The method of claim 1, wherein a color space in which the chroma conversion and the compensating are performed is a device dependent color space, and
wherein a chroma component value and a brightness component value of the input image in a device independent color space are substantially the same as values obtained by converting a color space comprising a chroma component value and a brightness component value on which the chroma conversion and the compensating are performed, in a device independent color space.

6. The method of claim 1, wherein the chroma conversion is performed according to a predetermined parameter, is performed in consideration of characteristics of an imaging apparatus for performing the chroma conversion, or is performed according to an input signal received from an external source.

7. The method of claim 1, wherein the chroma conversion and the compensating are performed in units of pixels of the input image.

8. The method of claim 1, further comprising:
when the input image is a RGB image, performing color-space conversion on the RGB image, and dividing the input image into the brightness component and the chroma component.

9. The method of claim 1, wherein the input image further comprises a hue value of a hue component of the input image.

10. An apparatus for enhancing chroma of an input image, the apparatus comprising:
a chroma converting unit that performs chroma conversion on a chroma value of a chroma component of the input image without converting a brightness value of a brightness component of the input image; and
a brightness compensating unit that compensates for a variation in an unconverted brightness value of the brightness component of the input image, the variation resulting from performing the chroma conversion, based on the chroma value on which the chroma conversion is performed.

11. The apparatus of claim 10, wherein a color space in which the chroma conversion is performed is a device dependent color space.

12. The apparatus of claim 11, wherein the device dependent color space is one of a YCbCr color space, a Hue, Saturation, Value (HSV) color space, and a Hue, Saturation, Intensity (HSI) color space.

13. The apparatus of claim 10, wherein, when the color space in which the chroma conversion is performed is a YCbCr color space, the brightness component is Y, the chroma component is Cb and Cr.

14. The apparatus of claim 10, wherein a color space in which the chroma conversion and the compensating are performed is a device dependent color space, and
wherein a chroma component value and a brightness component value of the input image in a device independent color space are substantially the same as values obtained by converting a color space comprising a chroma component value and a brightness component value on which the chroma conversion and the compensating are performed, in a device independent color space.

15. The apparatus of claim 10, wherein the chroma conversion is performed according to a predetermined parameter, is performed in consideration of characteristics of an imaging apparatus for performing the chroma conversion, or is performed according to an input signal received from an external source.

16. The apparatus of claim 10, wherein the chroma conversion and the compensating are performed in units of pixels of the input image.

17. The apparatus of claim 10, further comprising:
a first color space converting unit for, when the input image is a RGB image, performing color-space conversion on the RGB image, and dividing the input image into the brightness component and the chroma component.

18. The apparatus of claim 10, wherein the input image further comprises a hue value of a hue component of the input image.

19. A digital display apparatus comprising the apparatus of claim 10.

20. A non-transitory computer readable recording medium having recorded thereon a program for executing a method of enhancing chroma of an input image, the method comprising:
performing chroma conversion on a chroma value of a chroma component of the input image without converting a brightness value of a brightness component of the input image; and
compensating for a variation in an unconverted brightness value of the brightness component of the input image, the variation resulting from performing the chroma conversion, based on the chroma value on which the chroma conversion is performed.

21. A method of enhancing chroma of an input image, the method comprising:
receiving the input image, the input image comprising a chroma component having a first chroma value of chroma of the input image and a brightness component having a first brightness value of brightness of the input image;
chroma converting the first chroma value of the chroma component to a second chroma value of the chroma component without converting a brightness value which is unconverted;
predicting a variation between the first brightness value and a second brightness value of the brightness component, the variation from the first brightness value to the second brightness value occurring during the chroma converting;
calculating a variation degree of the brightness based on the predicted variation;
compensating the brightness of the input image based on the calculated variation degree and the first brightness value; and
outputting the chroma component having the second chroma value as a converted chroma component and outputting the compensated brightness as a converted brightness component.

22. The method of claim 21, wherein the calculating comprises calculating the variation degree based on the predicted variation, the first chroma value, and the second chroma value.

23. The method of claim 22, wherein the compensating comprises adding the variation degree to the first brightness value.

* * * * *